UNITED STATES PATENT OFFICE.

ROBERT GNEHM, OF BASLE, SWITZERLAND, ASSIGNOR TO THE SOCIETY OF CHEMICAL INDUSTRY, OF SAME PLACE.

PRODUCTION OF CHLOROPHTHALIC ACID.

SPECIFICATION forming part of Letters Patent No. 322,368, dated July 14, 1885.

Application filed February 26, 1885. (No model.)

*To all whom it may concern:*

Be it known that I, Prof. Dr. ROBERT GNEHM, a citizen of Switzerland, residing at Basle, Switzerland, have invented new and useful Improvements in the Production of Chlorophthalic Acid, of which the following is a specification.

This invention relates to the production of chlorophthalic acid by treating anhydrous phthalic acid with chlorine in presence of pentachloride of antimony.

In effecting my invention I proceed as follows: A mixture of five pounds of anhydrous phthalic acid and thirty pounds of pentachloride of antimony is heated for several hours at about 200° centigrade; then a gas containing chlorine is, while subjected to continual heating, led through the molten mass during eight to twelve hours. By this operation almost the entire quantity of anhydrous phthalic acid is converted into anhydride of tetrachlorphthalic acid. When submitted to distillation there is in the first instance driven off the pentachloride of antimony. (This is often mixed with trichloride of antimony.) The regenerated pentachloride of antimony can be used for another operation.

When the antimony compounds are driven off, then, if the heating be continued, the anhydride of the chlorophthalic acid distills off.

What I claim as new and original, and desire to secure by Letters Patent, is—

The production of tetrachlorophthalic acid (or its anhydride) by the action of chlorine upon anhydrous phthalic acid in presence of antimony pentachloride, as set forth.

In testimony whereof I have hereunto set my hand and seal in the presence of two subscribing witnesses.

ROBERT GNEHM. [L. S.]

Witnesses:
 GEORGE GIFFORD,
 CHS. A. RICHTER.